Jan. 19, 1971     D. M. BAUER ET AL     3,555,900

FLOW METER

Filed Dec. 5, 1968     8 Sheets-Sheet 1

INVENTORS
CLEMENT F. TAYLOR
DOUGLAS M. BAUER

BY

David Blumenfeld

ATTORNEY

Jan. 19, 1971        D. M. BAUER ET AL        3,555,900
                      FLOW METER

Filed Dec. 5, 1968                        8 Sheets-Sheet 2

SPEED TUBINE ANGLE ϕ

INVENTORS
CLEMENT F. TAYLOR
DOUGLAS M. BAUER
BY
David Blumenfeld
ATTORNEY

REACTION TURBINE ANGLE

INVENTORS
CLEMENT F. TAYLOR
DOUGLAS M. BAUER

ATTORNEY

INVENTORS
CLEMENT F. TAYLOR
DOUGLAS M. BAUER

ATTORNEY

INVENTORS
CLEMENT F. TAYLOR
DOUGLAS M. BAUER

United States Patent Office 3,555,900
Patented Jan. 19, 1971

3,555,900
FLOW METER
Douglas M. Bauer and Clement F. Taylor, Danvers, Mass., assignors to General Electric Company, a corporation of New York
Filed Dec. 5, 1968, Ser. No. 781,442
Int. Cl. G01f 1/06, 1/12
U.S. Cl. 73—194                16 Claims

ABSTRACT OF THE DISCLOSURE

A mass flowmeter system of the angular momentum type comprising swirl generating means, a speed turbine and a reaction turbine restrained by an electromagnetic torque motor. The reaction turbine is maintained in a balanced condition by a control loop into which turbine speed and position signals are introduced to control the torque motor current and torque. In this manner automatic compensation for changes in swirl velocity is obtained permitting direct measurement of mass flow rate without need for maintaining constant swirl velocity. Both analog and digital control and indicating systems are disclosed.

BACKGROUND OF THE INVENTION

The present invention relates to a mass flowmeter system and more particularly to a system for indicating mass flow rate and total flow. While the system has general utility it is particularly useful in aircraft fuel management systems to indicate the rate of fuel flow to an aircraft power plant and integrated flow of aircraft fuel.

Mass flowmeters of the angular momentum type such as shown, for example in U.S. Pat. 2,714,310 Jennings, are now widely used on aircraft to indicate mass flow of fuel. These flow meters comprise a motor driven impeller to impart angular velocity or swirl to the flowing fluid and a restrained reaction turbine which removes the swirl and in so doing, experiences a torque which is measured to provide an indication of mass flow rate. Because the measured reaction torque is affected by the angular velocity of the fluid as well as the mass flow rate, it is common practice to drive the impeller motor at constant speed to maintain constant angular velocity of the fluid and thereby avoid measurement error. However, precise motor speed control systems are expensive, add weight and consume considerable power especially at high flow rates. Efforts have been made to utilize the kinetic energy of the flowing fluid to impart swirl to the fluid by causing the fluid to pass through skewed vanes located upstream of the reaction turbine. While this eliminates the need for a motor driven impeller, it complicates the measurement of flow rate because the angular velocity or swirl rate of the measured fluid varies with the fluid flow rate. Since the reaction turbine torque is a measure of angular momentum of the fluid i.e. mass flow rate × angular velocity, it had heretofore been necessary to measure separately the angular momentum and the angular velocity and then divide the first quantity by the second by means of a computer to obtain an indication of mass flow rate. This indirect method of indicating mass flow rate adds undesirable complication and is apt to result in substantial measurement error.

Accordingly, it is an object of the present invention to provide an improved mass flowmeter system of the angular momentum type, that does not require a motor driven impeller or other swirl-generating means for imparting a constant swirl velocity to the measured fluid and yet provides direct measurement of mass flow rate with computation.

A further object of the invention is to provide a mass flowmeter system which provides a high degree of measurement accuracy and reliability without excessive cost.

A still further object of the invention is to provide an improved mass flowmeter system with a digital output to enable the flow metering equipment to be compatible with digital computers and other interconnected digital equipment.

Further objects and advantages of the invention will become apparent as the following description proceeds.

SUMMARY

Briefly, in accordance with the present invention a mass flowmeter system is provided comprising a transmitter adapted to be connected in the path of a flowing fluid the mass flow rate of which is to be measured and an associated control and indicating circuit network. The transmitter has a casing in which are mounted between the inlet and outlet ends in the order named; first, a set of fixed skewed vanes to impart angular velocity or swirl to the fluid about the flow axis; second, a rotatable speed turbine which rotates at the average swirl velocity of the fluid; and third, a rotatable reaction turbine restrained by an electromagnetic torque motor. The reaction turbine, being restrained, removes the fluid swirl and in so doing experiences a torque, balanced by the torque motor, proportional to the angular momentum of the fluid.

The control network comprises a pickoff associated with the speed turbine to generate a speed signal $S_1$ variable with turbine speed and a pickoff associated with the reaction turbine to generate a position signal $S_2$ variable with displacement of the reaction turbine from a reference zero flow position. Current supplied to the electromagnetic torque motor and hence the motor torque is caused to vary in accordance with the product of the speed and position signals ($S_1 \times S_2$) introduced into the control loop whereby the reaction turbine is maintained in a state of balance during steady state conditions.

For a balanced condition of the reaction turbine the torque $T_M$ exerted thereon by the torque motor must equal the angular momentum torque $T_T$ of the fluid which is proportional to the product of the mass flow rate $\dot{M}$ and the fluid swirl velocity $W$. This balance is not affected by changes in the swirl velocity $W$ because corresponding changes also occur simultaneously in the turbine speed signal $S_1$, the torque motor current $I_M$ and the motor torque $T_M$. However, any change in the mass flow rate $\dot{M}$, creates an unbalance between the angular momentum torque $T_T$ on the reaction turbine and the motor torque $T_M$. This causes the reaction turbine to move in a direction to change turbine position signal $S_2$, the motor current $I_M$ and the motor torque $T_M$ until balance is restored. The reaction turbine position signal $S_2$ thus becomes a measure of mass flow rate $\dot{M}$ which is not affected by changes in swirl velocity $W$. Therefore, it is unnecessary to use speed regulating means to maintain constant swirl velocity $W$ of the measured fluid or a computer to divide angular momentum torque $T_T$ of the fluid, which is proportional to $\dot{M}W$, by angular velocity $W$ to indicate mass flow rate. In this system reaction turbine position signal $S_2$ varies only with mass flow rate $\dot{M}$ and so may be read out directly on a suitable indicator either as a digital or analog quantity.

The multiplication of the turbine speed and position signals and the indication of the mass rate and total flow outputs may be accomplished with either digital or analog systems and both are disclosed. The digital system, which is preferred for some applications, is designed to provide a measurement system having low error with a minimum of precision components to convert digital and analog signals for control and indicating purposes as will be apparent from the following.

For a better understanding of the invention reference should be made to the following detailed description taken in connection with the accompanying drawings.

DESCRIPTION OF THE PREFERRED EMBODIMENTS

Figure 1:
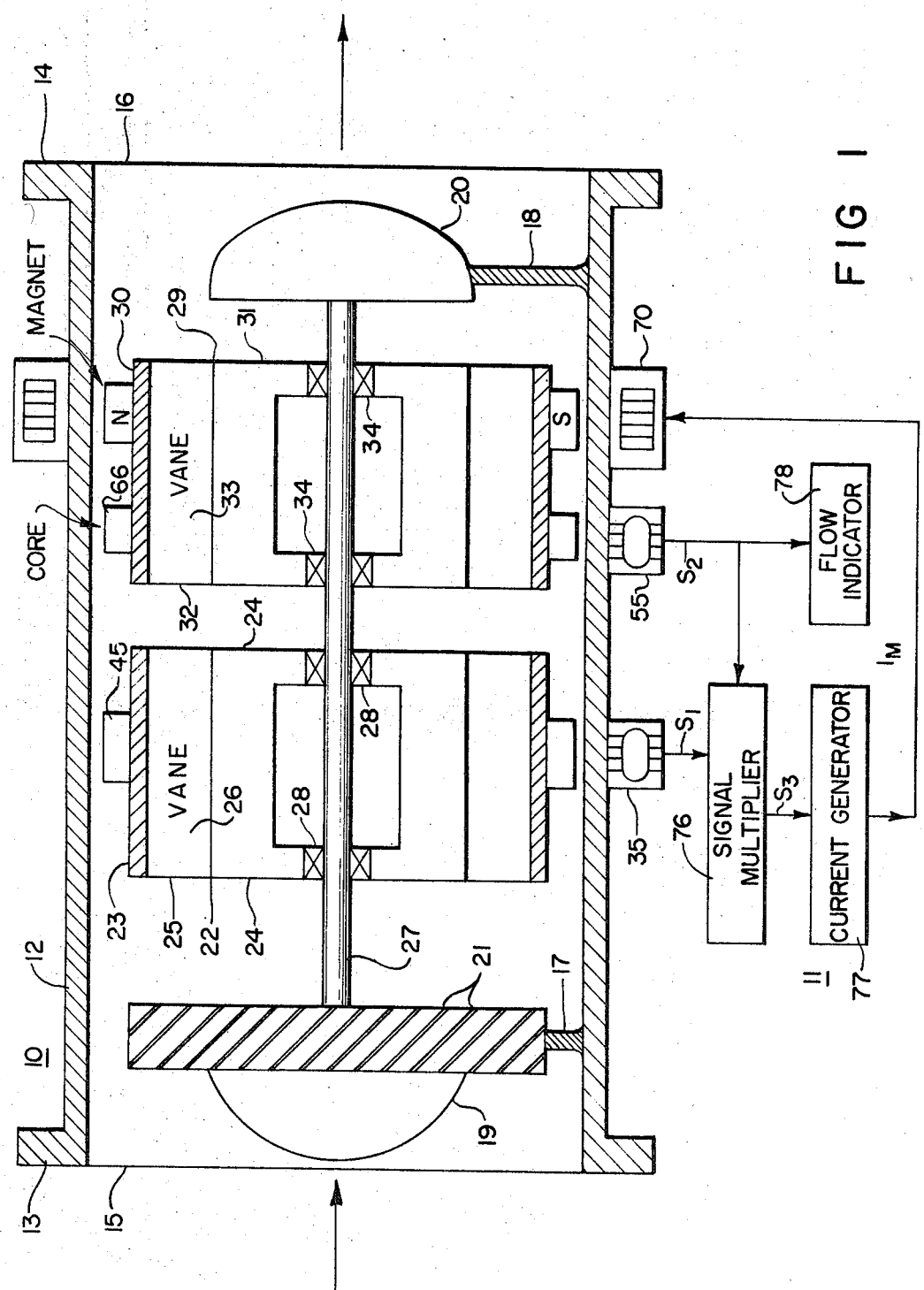
FIG. 1 is a cross-sectional schemtic view of a flowmeter transmitter together with a control and indicating system therefor shown in block diagram form illustrating the subject invention.

Referring to FIG. 1 of the drawing the flowmeter system of the present invention comprises a transmitter unit 10 and a control and indicating network 11 associated therewith. The transmitter 10 shown as a cross-sectional schematic view for clarity, has a cylindrical casing 12 formed of a suitable nonmagnetic material provided with end flanges 13 and 14 adapted to be connected into a fluid conduit through which flows a fluid the mass flow rate of which is to be measured. Fluid enters the inlet end 15 and leaves at the outlet end 16. Mounted within the housing 12 adjacent the inlet and outlet ends are fixed supporting struts 17 and 18 having bullet-shaped streamlined sections 19 and 20 to facilitate streamline flow of fluid entering and leaving the transmitter.

For the purpose of imparting angular velocity or swirl to the entering fluid about the longitudinal flow axis of casing 12 there is provided a set of skewed vanes 21 disposed about the periphery of section 19 and inclined at an angle to the flow direction through casing 12. In actual practice the vanes may be formed by cutting angled slots in the streamlined section 19.

For the purpose of determining the angular or swirl velocity of the fluid there is provided a speed turbine 22 located adjacent to and downstream from the swirl vanes 21. The speed turbine has an outer cylindrical shroud 23 spaced from a supporting hub 24 by a plurality of radial vanes 25 providing axial channels 26 for guiding the flow of fluid therethrough between the hub and the shroud. The hub 24 is rotatably supported on a fixed shaft 27 extending axially between end sections 19 and 20 by means of bearings 28. Swirling fluid leaving vanes 21 impinges on vanes 25 of the speed turbine 22 causing it to rotate at a speed equal to the average angular velocity of the fluid. Preferably the axial length of the speed turbine vanes 25 and and channels 26 is made sufficiently long so that all of the fluid leaving the speed turbine on the downstream side has a uniform angular velocity which is the same as the rotating speed of the turbine. In other words the speed turbine performs an averaging as well as a speed measuring function.

The swirl of the fluid leaving the speed turbine 22 is removed by a reaction turbine 29 located adjacent to and downstream from the speed turbine. The reaction turbine is similar in construction to the speed turbine and has an outer cylindrical shroud 30 spaced from a hub 31 by a plurality of radial vanes 32 which form axial channels 33 for guiding the flow of fluid therethrough. The hub 31 is rotatably supported on shaft 27 by means of bearings 34. Preferably the diameters of the hubs and shrouds of the speed and reaction turbines are the same so as to provide axial flow of the fluid through both turbines at the same radial distance from shaft 27. Rotation of the reaction turbine 29 is restrained by an electromagneitc torque motor to be later described so that swirl of the fluid is removed by impinging against vanes 32 which guide the fluid in an axial direction. Upon leaving the reaction turbine on the downstream side the fluid passes out of the outlet end 16 of the transmitter. The reaction turbine is provided with stops (not shown) which permit deflection preferably 2 to 10 degrees within the measurement range between zero flow and maximum flow positions.

The inducting and control network indicated generally by the number 11 in FIG. 1 requires as inputs a speed signal $S_1$ variable in accordance with the angular velocity of speed turbine 22 and a position signal $S_2$ variable in accordance with the angular deflection of the reaction turbine 29 in its operating range. These signals $S_1$ and $S_2$ are provided by pickoffs the construction of which will now be described.

Figure 2:
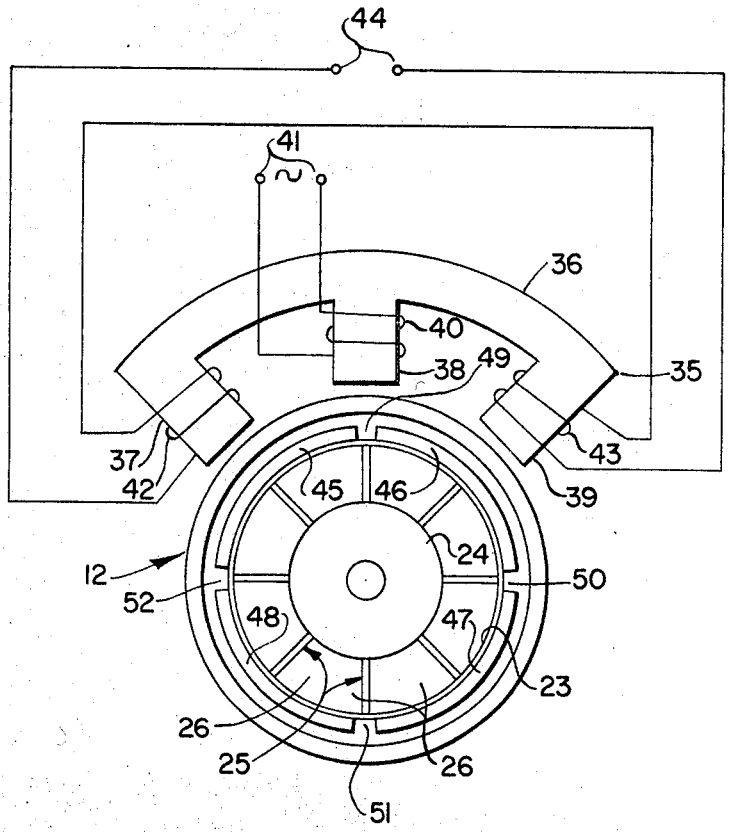
FIG. 2 shows details of the speed turbine pickoff forming a part of the transmitter.
Figure 3:
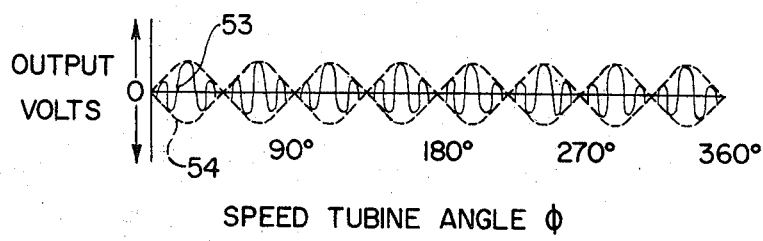
FIG. 3 is a graphical representation of the output voltage of the speed turbine pickoff.

The speed turbine 22 has a pickoff 35 the construction of which is shown in FIG. 2. It comprises an E shaped core 36 formed of laminated magnetic material mounted on the exterior of casing 12 opposite the speed turbine 22 by suitable fastening means not shown. The core is curved to conform to the contour of the housing and extends around the housing for about 90 degrees. It has radially projecting pole pieces 37, 38 and 39 spaced slightly from the casing 12. The pole piece 38 carries an excitation winding 40 energized from a suitable source 41 of alternating current and the pole pieces 37 and 39 carry output windings 42 and 43 connected in series to pickoff output terminals 44. The windings 42 and 43 are connected series opposited so that the voltages induced therein are in opposite directions whereby the voltage across output terminals 44 is the difference between the voltages induced in the output windings. The magnetic flux produced by the excitation winding 40 passes through the E core 36, the pole pieces 37 and 39 and returns to pole piece 38 through magnetic cores secured to and rotating with the shroud 23 of the speed turbine. In the embodiment illustrated there are four cores 45, 46, 47 and 48 circularly mounted around the shroud 23 in a suitable manners as by cementing and separated by four air gaps 49, 50, 51, and 52 equally spaced at 90° intervals. Preferably the cores 45, 46, 47 and 48 each extend about 89° and the air gaps about 1°. The number of segmented cores is determined by the desired modulation frequency range of the signal voltage across output terminals 41. When the speed turbine is in the position shown in FIG. 2 wherein air gap 49 is centrally located under excitation pole piece 38, the excitation magnetic flux divides equally between two parallel circuits one threading pole piece 37 and the other pole piece 39. Voltages induced in the output windings 42 and 43 are connected series opposed, the voltage at the output terminals 44 is zero. When rotation of the speed turbine carries air gap 49 to a position 22½° to the right of that shown magnetic flux density threading output winding 42 will exceed that threading output winding 43 because the high reluctance air gap lies in the magnetic circuit threading winding 43 but not in the circuit threading winding 42. When the air gap lies in a position 22½° to the left of that shown, the reverse action takes place and the output of winding 43 exceeds that induced in winding 42 because the air gap lies in the other magnetic circuit. Thus, during rotation of the speed turbine the four air gaps 49, 50, 51 and 52 sequentially enter the two parallel magnetic circuits threading output windings 42 and 43 causing an amplitude modulation of the output voltage at a frequency proportional to the speed of the turbine and the number of air gaps. The output voltage characteristic is shown in FIG. 3 from which it will be seen that the A-C output voltage wave 53 having a frequency equal to the A-C input frequency supplied to excitation terminals 41 is modulated as indicated by envelope 54 with zero points occurring at 45° intervals of the speed turbine angle $\phi$. Thus, during each complete revolution of the speed turbine there will be eight zero or crossover points. In the control system to be described the modulation frequency of the output voltage of pickoff 35 is used as a signal $S_1$ indicative of the angular velocity of the speed turbine 22 which is also the swirl velocity of the metered fluid.

Figure 4:
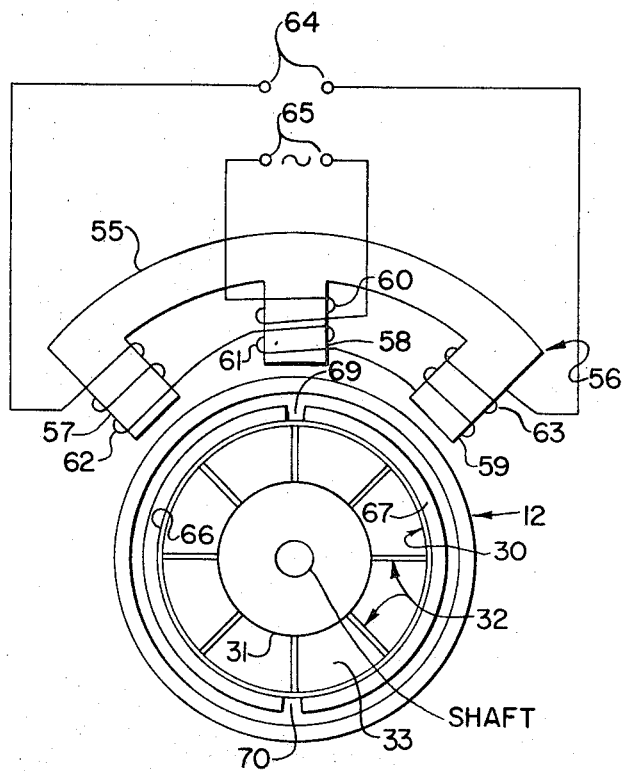
FIG. 4 shows details of the reaction turbine pickoff forming a part of the transmitter.
Figure 5:
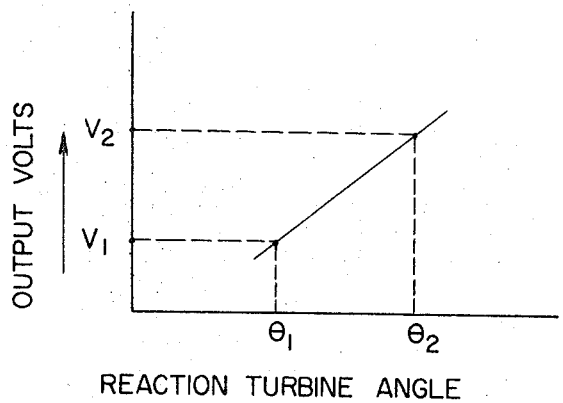
FIG. 5 is a graphical representation of the output voltage of the reaction turbine pickoff.

The construction of reaction turbine position pickoff 55 is shown in FIG. 4 from which it will be noted that it is generally similar to speed turbine pickoff 35. Thus, it comprises an E core 56 mounted on the exterior of the casing 12 opposite the reaction turbine 29 with three radialy projecting pole pieces 57, 58 and 59 spaced slightly from the casing. The central pole piece 58 carries an excitation winding 60 and a bias winding 61 while the pole pieces 57 and 59 carry output windings 62 and 63. The output and bias windings 61, 62 and 63 are serially connected to output terminals 64 and the excitation winding is connected to a source of alternating current 65. Two segmented cores 66 and 67 are circularly mounted on shroud 30 of reaction turbine 29 in a suitable manner as by cementing and spaced by diametrically opposite air gaps 69 and 70. The air gap 69 may occupy a limited range of positions on either side of the central position shown on FIG. 4, the reaction turbine being restrained by the torque motor and by stops (not shown) to a range preferably not exceeding about 10°. The function of the air gap 70 is to prevent a magnetic short circuit around air gap 69. As in the case of the speed turbine pickoff the excitation magnetic flux splits between two parallel paths, one including the pole piece 57 and the other the pole piece 59. When air gap 69 is in the central position shown the voltages induced in the output windings 62 and 63 are equal and opposite and cancel out. Deflection of the reaction turbine in either direction creates an unbalance in the voltages induced in windings 62 and 63 to change the voltage across output terminals 64. The purpose of the bias winding 60 is to displace the zero output point so that the linear portion of the output characteristic may be used without reversal of the output voltage. The output voltage characteristic of the reaction turbine position pickoff 55 is shown in FIG. 5 from which it will be noted that as the reaction turbine moves through its operating range from zero flow at angle $\theta_1$ to maximum flow angle $\theta_2$ the A-C output voltage at the frequency of the supply voltage 65 varies from values $V_1$ to $V_2$ in an approximately linear manner. In the control system to be described the A-C output voltage of the reaction turbine pickoff is used as a signal $S_2$ indicative of the angular displacement or deflection of the reaction turbine from a zero flow position.

Figure 6:
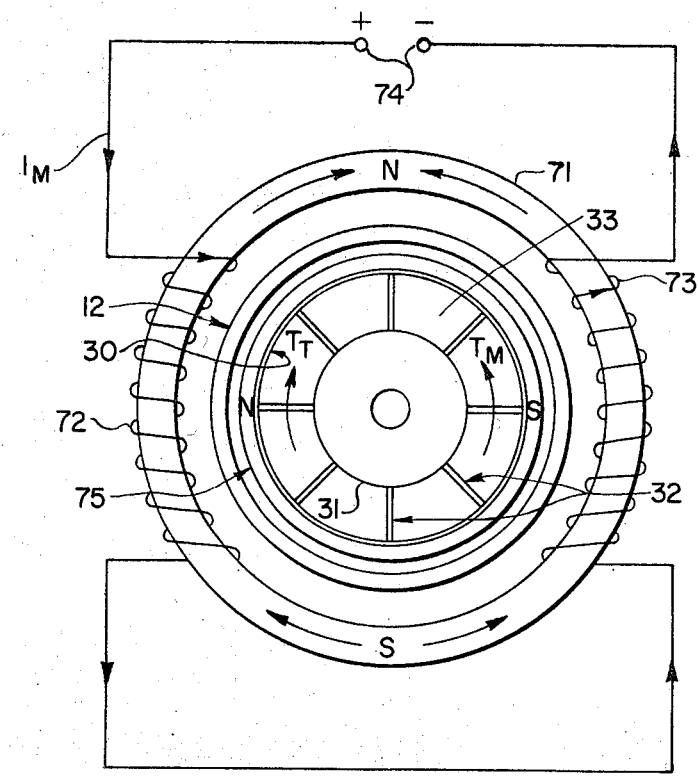
FIG. 6 shows details of the reaction turbine torque motor forming a part of the transmitter.
Figure 7:
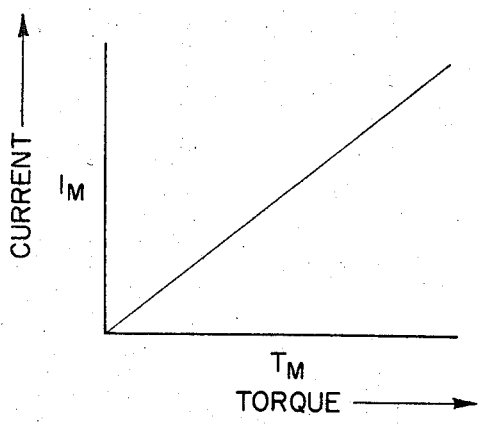
FIG. 7 is a graphical representation showing the current-torque relationship of the reaction turbine torque motor.

An electromagnetic torque motor 70 is used to yieldably restrain the reaction turbine in its operating range by applying thereto an electrically controlled balancing force. The construction of the torque motor is shown in FIG. 6. The torque motor comprises an annular core 71 of laminated magnetic material mounted around the outside of casing 12 opposite the reaction turbine. The sides of the ring carry two oppositely wound windings 72 and 73 serially connected so that when supplied with a D.C. current from input terminals 74 opposing magnetic fluxes are developed which establish diametrically opposite north and south poles N and S at the top and bottom of the ring. The magnetic flux produced by windings 72 and 73 reacts with the magnetic flux from north and south poles N and S of a ring-shaped permanent magnet 75 mounted on the outside of shroud 30 and secured in a suitable manner as by cementing so as to lie opposite ring 71 inside of casing 12. The diametric axis of poles N and S of the ring magnet 75 is normally at right angles to the diametric axis of the poles N and S of the annular core 71. Thus, when a DC current $I_M$ flows through the windings 72 and 73 in the direction indicated by the arrows a torque is exerted on the reaction turbine in a direction indicated by the arrow $T_M$ which is opposite to the torque exerted on the reaction turbine by the fluid reaction force indicated by the arrow $T_T$. By adjusting the magnitude of the torque motor current $I_M$ the motor torque may be varied to achieve a balanced condition for various flow conditions.

The control and indicating network 11 for the flowmeter system is shown by the block diagram in FIG. 1. The speed signal $S_1$ from the speed turbine pickoff 35 and the position signal $S_2$ from the reaction turbine pickoff 55 are both fed as inputs to a signal multiplier 76 having a signal output $S_3$ varying as the product of the signals $S_1$ and $S_2$. The signal $S_3$ is fed to a current generator 77 which supplies a direct current $I_M$ to the torque motor 70 which varies in accordance with the input signal $S_3$. The signal $S_2$, which varies with the mass rate of flow through the transmitter 10 as will be further explained, is also fed to a flow indicator 78 which indicates the mass flow rate. Total flow may also be indicated by integrating the flow signal in a known manner if desired.

OPERATION

The operation of the basic flowmeter system of FIG. 1 may now be explained. During operation fluid to be measured enters the inlet end 15 of the transmitter 10 and passes through the skewed vanes 21 which impart angular velocity or swirl to the fluid. The swirling fluid impinges on the vanes 25 of speed turbine 22 causing it to rotate at a speed equal to average speed of the fluid leaving the turbine on the downstream side. The swirling fluid after passing through flow channels 26 of the speed turbine impinges on the vanes 32 of the reaction turbine 29 which under steady state conditions is restrained by torque motor 70. The swirl velocity of the fluid is therefore removed by the reaction turbine and after passing through the flow channels 33 leaves the outlet end of 16 of the transmitter. The control network 11 receives the input signals $S_1$ and $S_2$ from the speed turbine and reaction turbine pickoffs 35 and 55 and continuously adjusts the current $I_M$ to the torque motor 70 to maintain the reaction turbine in a state of balance during steady state conditions. The balanced condition is maintained during operation in the following manner. If the swirl velocity of the fluid increases there will be a corresponding increase in the speed of the speed turbine 22 and the output signal $S_1$ from the pickoff 35. This causes simultaneously a proportional increase in the torque motor current $I_M$ and the torque output of the torque motor 70 so that balance is maintained and the position of the reaction turbine does not change. If the swirl velocity decreases the reverse action takes place with no change in the balance or the position of the reaction turbine. Thus, the position of the reaction turbine is insensitive to changes in swirl velocity. However, if the mass flow rate increases the fluid torque on the reaction turbine will increase since it is proportional to the product of the mass flow rate M and the swirl velocity W. This causes the fluid torque $T_T$ to become greater than the motor torque $T_M$ and as a result the reaction turbine moves in a direction to increase the output signal $S_2$ of the pickoff 55. This, in turn, causes an increase in the motor current $I_M$ and the motor torque $T_M$ until balance is re-established between the fluid torque $T_T$ and the motor torque $T_M$ which will occur at the new angular position of the reaction turbine. If a decrease in the mass flow rate $\dot{M}$ occurs the reverse action takes place. Thus, the angular position of the reaction turbine varies with mass flow rate $\dot{M}$ but is not affected by change in the swirl velocity $W$. Since the output signal $S_2$ varies with the angular position of the reaction turbine, it is indicative of mass flow rate $\dot{M}$ and so may be used to actuate the flow indicator 78. An understanding of this action is facilitated by a consideration of the following equations.

Under steady state conditions the torque $T_M$ applied to the reaction turbine 29 is equal and opposite to the fluid torque $T_T$ exerted on the reaction turbine. Thus (1) $$T_T = T_M$$

Because the reaction turbine, being restrained, removes all of the angular velocity or swirl from the flowing fluid the fluid torque $T_T$ is proportional to the product of the swirl velocity $W$ and the mass flow rate $\dot{M}$. Thus (2) $$T_T \alpha \dot{M} W$$

The speed turbine pickoff produces an output signal $S_1$ which is proportional to the turbine speed and also the angular velocity of the fluid. Thus (3) $$S_1 \alpha W$$

Also, by design, the torque motor current $I_M$ is proportional to the motor torque $T_M$. Thus (4) $$I_M \alpha T_M$$

By action of the signal multiplier 76 and current generator 77 the motor current $I_M$ is proportional to the product of the speed turbine and reaction turbine pickoff signals $S_1$ and $S_2$. Thus, (5) $$S_1 S_2 \alpha I_M$$

From the foregoing equations it is apparent that:

$$T_T = T_M \alpha I_M \alpha S_1 S_2 \alpha \dot{M} W$$

Substituting $W$ for $S_1$ $$S_2 W \alpha \dot{M} W$$
$$\therefore S_2 \alpha \dot{M} \; Q.E.D.$$

An important advantage of this flow metering system is that a linear relationship between the angular position of the reaction turbine and the output $S_2$ of the pickoff 55 is not required. For a condition or torque balance i.e. $T_T = T_M$ the signal $S_2$ necessarily is proportional to the mass flow rate if the other transducers in the control loop are linear. These other transducers, namely the speed pickoff 35, the signal multiplier 76, the current generator 77 and the torque motor 70 can be manufactured with a high degree of linearity without excessive cost. Thus, this system makes possible a flowmeter having higher degree of accuracy than has been possible heretofore at a relative cost.

The control and indicating network 11 of FIG. 1 may be embodied in both analog and digital systems and both are disclosed. An analog system will now be described for illustration.

ANALOG SYSTEM

Figure 8:
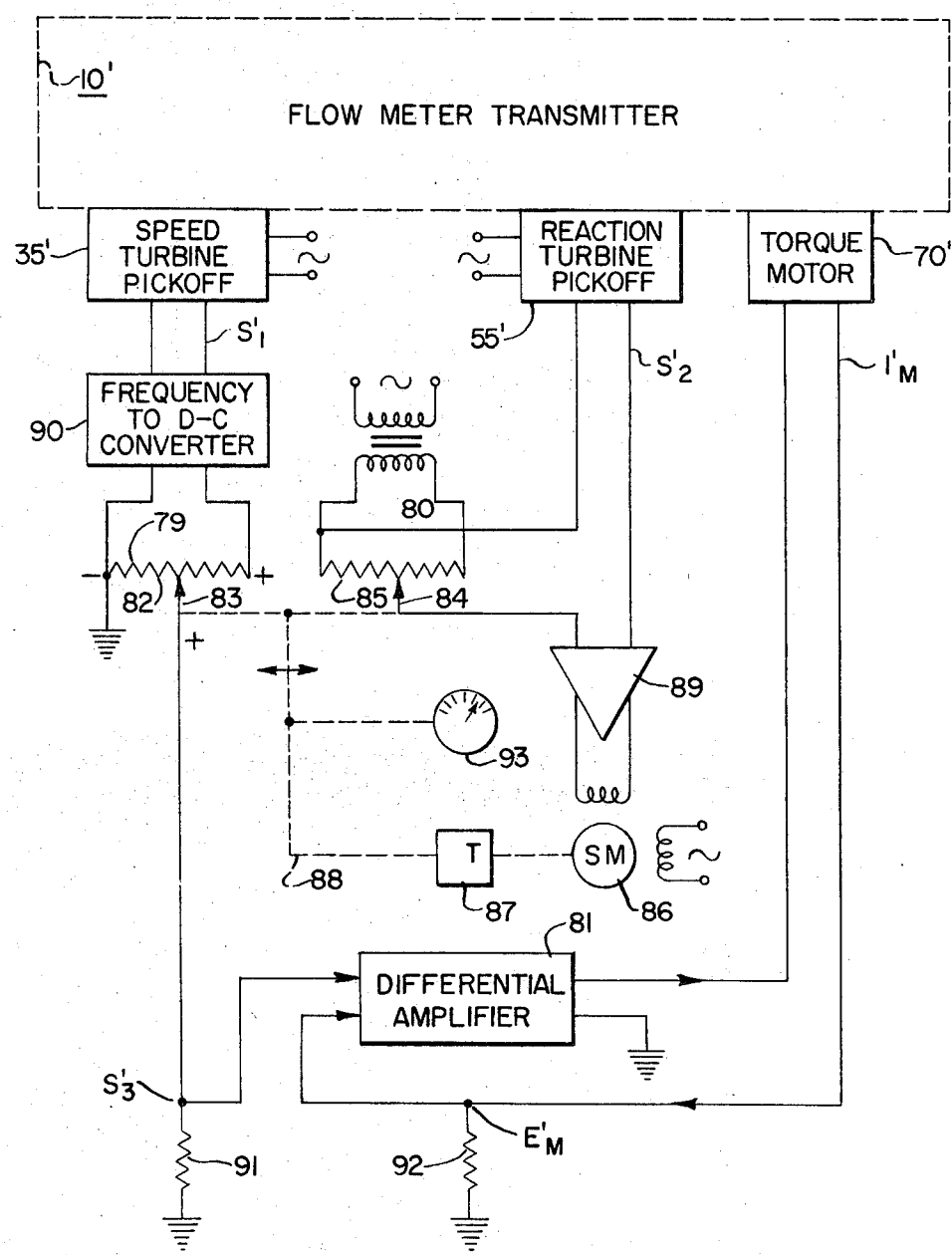
FIG. 8 illustrates an analog embodiment of the indicating and control system for the transmitter shown in diagrammatic form in FIG. 1.

Referring to FIG. 8 an analog system is shown which uses a potentiometer arrangement for multiplying the turbine speed and position signals $S_1$ and $S_2$. The mechanical parts of the transmitter may be the same as in FIG. 1 and are represented by the box formed by the dash line 10'. The speed turbine pickoff 35, the reaction turbine pickoff 55, and the torque motor 70 of FIG. 1 are represented by the boxes 35', 55' and 70' respectively. Similarly, the inputs from the pickoffs are labeled $S_1'$ and $S_2'$ and the output current to the torque motor $I_M'$.

The input signals $S_1'$ and $S_2'$ are multiplied by two potentiometers 79 and 80 and the output current $I_M$ is supplied to the torque motor 70' by a differential amplifier 81 controlled by the multiplied output signal $S_3'$.

The potentiometer 79 has a fixed resistor 82 and a slider 83 mechanically ganged to a slider 84 on a fixed resistor 85 of potentiometer 80. Both sliders are positioned by a servo motor 86 through a gear train 87 and an output shaft 88. The direction of rotation of the servo motor 86 is controlled by a null balance amplifier 89 having an error signal input equal to the difference between the signal $S_2'$ and the balance voltage across the output of potentiometer 80 energized from a suitable A-C source. This servo system operates in a well-known manner to position the output shaft 88 in accordance with the magnitude of input signal $S_2'$.

The input signal $S_1'$ from the speed turbine pickoff 35' is fed to a frequency to direct current converter 90 the D-C output of which is connected across resistor 82 of potentiometer 79. The D-C voltage across the output of potentiometer 79 therefore varies with the speed turbine pickoff signal $S_1$. Also, since the slider 83 is mechanically coupled to the servo output shaft 88 it also varies with the reaction turbine pickoff signal $S_2'$. The output signal $S_3'$ appearing across a fixed resistor 91 therefore varies as the product of the input signals $S_1'$ and $S_2'$. Current $I_M'$ flowing to the torque motor 70' from the differential amplifier 81 develops a voltage $E_M'$ across a fixed resistor 92 which varies with the current $I_M'$. The signal voltages $S_3'$ and $E_M'$ are fed as inputs to the differential amplifier which acts in a known manner to regulate the torque motor current $I_M'$ so that it corresponds to the signal voltage $S_3'$. Since the signal voltage $S_3'$ varies with the product of the input signals $S_1'$ and $S_2'$ from the turbine speed and position pickoffs 35' and 55', the torque motor current $I_M'$ and torque also varies with the product of these signal inputs. As explained in connection with the system of FIG. 1 the signals $S_2'$ is therefore a measure of the mass flow rate. Since the position of shaft 88 also corresponds to the signal $S_2'$ it may be used to drive a suitable indicator 93.

DIGITAL SYSTEM

Figure 9:
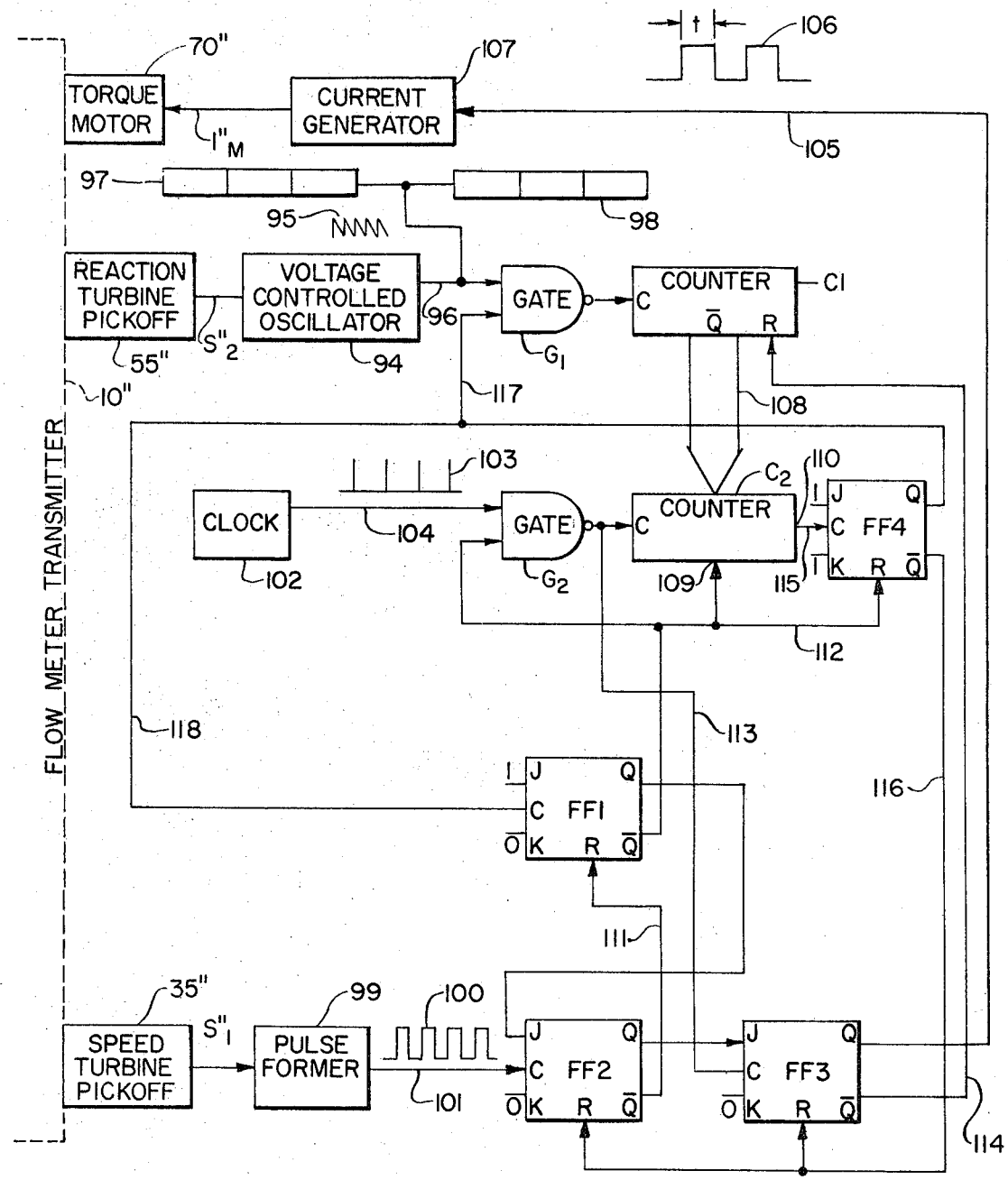
FIG. 9 illustrates a digital embodiment of the indicating and control system for the transmitter shown in diagramatic form in FIG. 1.

The control and indicating network 11 of FIG. 1 may also utilize a digital system for controlling the torque motor current in accordance with the product of the turbine speed and position signals and for indicating the mass flow rate and total flow. Such a system is illustrated in FIG. 9. The mechanical parts of the transmitter may be the same as in FIG. 1 and are indicated by the box formed by dash line 10''. Similarly, the speed turbine and reaction turbine pickoffs are identified by numbers 35'' and 55'' and the torque motor by the number 70''. Also, the output signals from the pickoff are identified as $S_1''$ and $S_2''$ and the torque motor current by $I_M''$ to facilitate the identification of corresponding parts and circuits.

In the digital system the reaction turbine output signal $S_2''$, which represents mass flow rate, is fed to a voltage controlled oscillator 94 of known construction. The voltage controlled oscillator is a transducer which converts the input voltage signal $S_2''$ to an output voltage having a frequency $f$ approximately proportioned to the input voltage. It may, for example, be a relaxation oscillator having a capacitor which is periodically charged at the beginning of a cycle and discharged at a rate proportional to the input voltage. Since the discharge rate is proportional to pickoff voltage. The saw tooth output wave form 95 is illustrated adjacent the output lead 96. Since the number of cycles or pulses in the output of the voltage controlled oscillator represents mass flow they may be counted by a conventional counter indicator 97 and a counter totalizer 98 shown as being connected to the output lead 96. The number of cycles counted per unit time is mass flow rate shown in the counter indicator 97 and the total cycles counted indicates total flow on the counter totalizer 98. Thus, the conversion of the reaction turbine pickoff signal $S_2''$ to a variable frequency greatly facilitates the digital indication of mass flow rate and total flow.

The manner in which the turbine pickoff signals $S_1''$ and $S_2''$ are multiplied to control the torque motor current $I_M''$ in the digital system will now be described.

The speed turbine pickoff signal $S_1''$ is fed to a pulse former 99 of known construction which demodulates the pickoff voltage and uses a cross detector circuit to produce output voltage pulses the frequency of which is variable with turbine speed. These pulses 100 shown adjacent the output lead 101 have a shape suitable for triggering flipflops, gates and binary counters utilized in the control network.

As shown by the logic diagram the control network comprises two binary counters C1 and C2 controlled by two gates G1 and G2 and four flipflops FF1, FF2, FF3, and FF4. The network receives as inputs the output from the voltage controlled oscillator 94 on lead 96, the output from the pulse former 99 on lead 101 and the output from a timing oscillator or clock 102 in the form of steep timing pulses 103 shown adjacent output lead 104.

Figure 11:
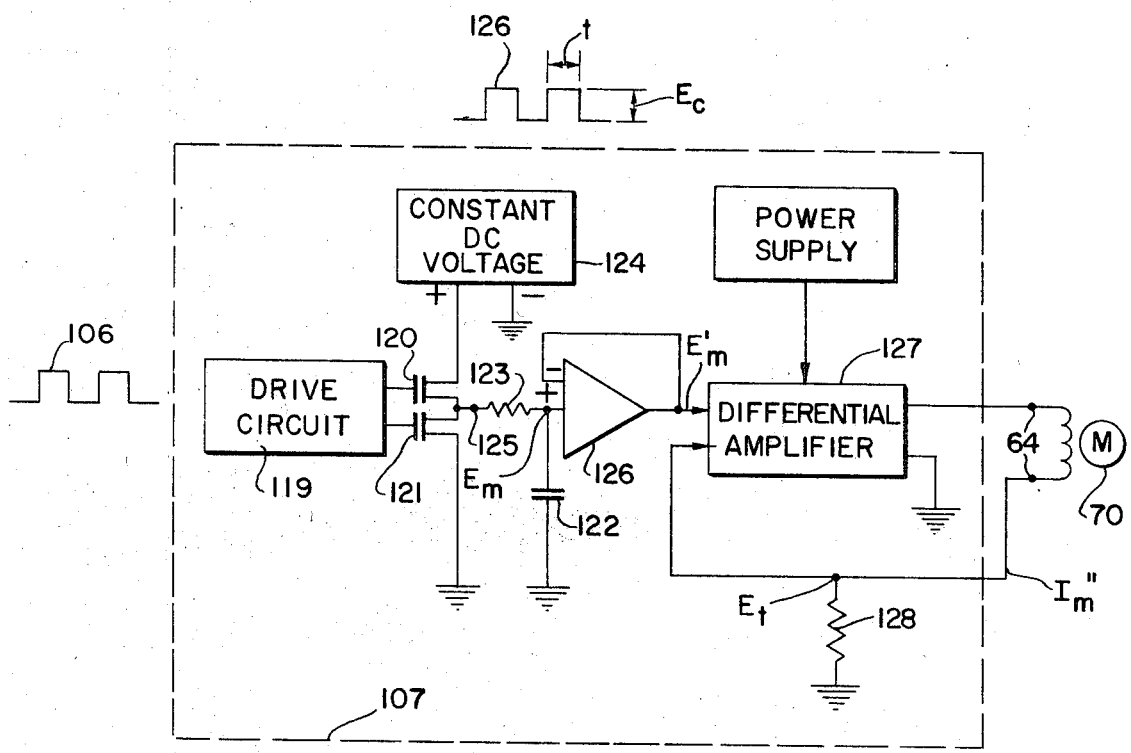
FIG. 11 shows details of the current generator forming a part of the digital control system of FIG. 9.

The control network produces as an output on lead 105 a series of control pulses 106 having a repetition rate controlled by the speed turbine pickoff signal $S_1''$ and a pulse width variable in accordance with the reaction turbine pickoff signal $S_2''$. These control pulses are fed to current generator 107 which produces an output current $I_M''$ for the torque motor 70'' which varies in accordance with the product of the pickoff input signal $S_1''$ and $S_2''$ as will be further explained in connection with the description of the current generator (FIG. 11).

Turning now to the operating details of the control network bistable multivibrator circuits or flipflops FF1, FF2, FF3 and FF4 are of the so called J–K type commercially available from the Signetics Corporation, Sunnyvale, Calif. Each flipflop has clock and reset inputs C and R, outputs Q and $\overline{Q}$, and inputs J and K. The operating characteristic of these flipflops is shown by the following truth table which shows the condition of the output Q after a clock pulse is applied to terminal C for different conditions of input terminals J and K (0 or 1) before the clock pulse. A zero input to reset terminal R always returns the output of the Q terminal to zero.

| $J_n$ | $K_n$ | $Q_{n+1}$ |
|---|---|---|
| 0 | 0 | $Q_n$ |
| 1 | 0 | 1 |
| 0 | 1 | 0 |
| 1 | 1 | $Q_n$ |

Some of the J and K input terminals of the flipflops are maintained at either the 0 or 1 level and where this is the case the numbers 1 or 0 appear opposite the terminals on the drawing.

Binary counters C1 and C2 are also known types sold commercially by the above-mentioned Signetics Corporation and comprise a series of sequentially operated flipflops which provide a binary count of input pulses until they are full when they generate a carry pulse for control and reset purposes. The counters C1 and C2 are parallel connected as indicated by arrow 108. The counter C1 transfers its count to counter C2 when a pulse is applied to a data strobe terminal 109. By connecting the $\overline{Q}$ terminals of the flipflops in counter C1 to the data input terminals of the counter C2 the complement of the count on counter C1 is transferred to counter C2. The complement of the count N on counter C1 is the difference between the range of counter C2 (No) and count N on counter C1 i.e. No–N. When counter C2 is loaded with a No–N count it becomes full and generates a carry pulse on its output terminal 110 after it received N additional pulses from clock 102. The gates G1 and G2 are turned on when both input signals are at the 1 (as distinguished from 0) level.

Figure 10:
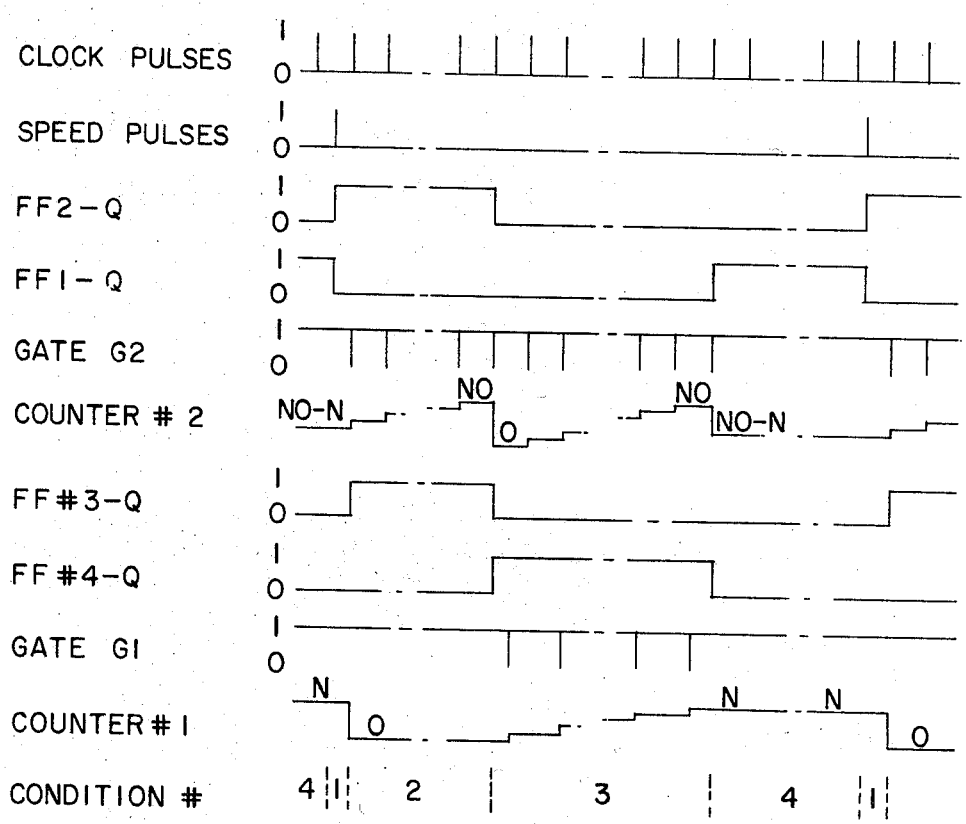
FIG. 10 is a logic time sequence plot useful in explaining the operating sequence of the digital control system of FIG. 9.

The logic time sequence plot shown in FIG. 10 illustrates graphically the operating sequence of the digital control system which will now be explained. Referring to FIG. 10 pulses from clock 102 appear across the top of the plot. To condense the scale some of the pulses are omitted as indicated by the dash lines. Underneath the clock pulses are the speed turbine pulses from the pulse former 99. Also shown are the conditions of the Q terminals of the flipflops FF1, FF2, FF3 and FF4 and the on-off conditions of gates G1 and G2. The stepped ramp lines show the buildup of counts on the counters C1 and C2 and the vertical dash lines at the bottom define the boundaries of operating conditions 1, 2, 3 and 4.

Condition 4 is a ready condition. The Q outputs of flipflops FF2, FF3 and FF4 are in the 0 state and the Q output of flipflop FF1 is in the 1 state. Gates G1 and G2 are off and so allow no pulses to pass through. Counter C1 is holding the N count accumulated during the previous cycle. Counter C2 is holding the complement of the count in counter C1 i.e. (No–N (which was strobed into its data input terminals at the end of the previous cycle.

Condition 1 begins with the receipt of a speed turbine pulse from the pulse former 99 through lead 101. The input pulse causes flipflop FF2 to change state which in turn resets flipflop FF1 through lead 111. The $\overline{Q}$ output of flipflop FF1 goes from 0 to 1, removing the data strobe signal from counter C2 through terminal 109 and opens gate G2. The clock pulses are now free to enter the counter C2.

Condition 2 begins with the first clock pulse through G2 after the speed turbine pulse which triggers flipflop FF3 through lead 113 to start the output pulse 106 on lead 105. After N clock pulses have entered counter C2, it overflows triggering flipflop FF4 through load 115. The $\overline{Q}$ output of flipflop FF4 resets flipflops FF2 and FF3 through lead 116 thus terminating the output pulse 106 at the end of condition 2 after a time interval proportioned to N. The Q output of flipflop FF4 opens gate G1 through lead 117 allowing pulses from the voltage controlled oscillator 94 through lead 96 to enter counter C1 and condition 3 begins. Gate 2 remains open.

After No additional clock pulses, counter C2 again overflows and toggles flipflop FF4 through lead 115 which in turn changes the state of flipflop FF1 through lead 118. Gates G1 and G2 are both closed preventing additional pulses from entering the counters. Counter C1 has now accumulated another N count which is immediately strobed into counter C2 through parallel leads 108 because the $\overline{Q}$ output of flipflop FF1 has gone to the 0 state. Thus, the circuit is again in condition 4 and awaits the next speed pulse from pulse former 99 which causes the above-described cycle to repeat. In this manner a series of output pulses 106 is generated having a pulse width of time duration $t$ which is proportional to the pulse count N on counter 1 and hence the mass flow rate.

The control network output pulses 106 are converted to a current $I_M''$ by the current generator 107 shown in greater detail in FIG. 11. Control pulses 106 are fed to a drive circuit 119 which alternately closes transistor (MOSFET) switches 120 and 121 in response to high and low values of the input control pulses. When switch 120 is closed and switch 121 is open in response to a pulse 106 a capacitor 122 is connected through a resistor 123 to a source 124 of constant D-C voltage which may, for example, be a Zener diode circuit and the capacitor charges. After the control pulse 106 switch 120 opens and switch 121 closes connecting capacitor 122 to ground through resistor 123 and the capacitor discharges. Because the constant voltage source 124 holds the amplitude constant, the voltage at point 125 has a square wave form in series of output pulses 126 corresponding to control pulses 106 except that they have constant amplitude $E_C$. The width of these pulses determined by the time interval $t$ varies with the reaction turbine signal $S_2''$ and the frequency with the speed turbine pickoff signal $S_1''$. The average value of these control pulses which varies with the product of these signals ($S_1'' \times S_2''$) appears as a voltage $E_M$ across capacitor 122 which acts as a filter. The voltage $E_M$ is fed through a buffer amplifier 126 as an input voltage $E_M'$ to a differential amplifier 127 which performs a function similar to the differential amplifier 81 of FIG. 8. It functions to supply current $I_M''$ to the input terminals 64 of the torque motor 70 which varies with the input voltage $E_M'$. Any departure from this condition causes a voltage $E_T$ across a fixed resistor 128 to differ from voltage $E_M'$ whereupon the differential amplifier changes the input current $I_M''$ to restore the voltage balance. Thus, the control pulses 126 are frequency modulated in accordance with speed turbine pickoff signal $S_1''$ and pulse width modulated in accordance with the reaction turbine pickoff signal $S_2''$. Since the amplitude of these control pulses is maintained constant, their average value varies with the product of signals $S_1''$ and $S_2''$ as does the torque motor current $I_M''$. Alternatively, the control pulse width may be maintained constant and the control pulse amplitude may be modulated in accordance with the signal $S_2''$ to obtain turbine pickoff signal multiplication.

An outstanding advantage of the digital control and indicating system is its inherent accuracy based on counting discrete pulses as compared with an analog system which senses continuously varying qualities. Such a system is much less sensitive to signal transmission error and error caused by spurious signals resulting from inductive and capacitive pickup from other electrical equipment. As to the accurary of components used in the digital system, it is noted that timing oscillators are now available with a very high degree of accuracy at reasonable cost. Also, there is essentially no error in the speed turbine pickoff 35 since it is digital in nature. Further, the torque motor 20 may be constructed with a high degree of linearity at a relatively low cost. Still further, it should be noted that the digital system of the present invention does not require linearity between the angular position of the reaction turbine and the output frequency $f$ of the voltage controlled oscillator 94. If the timing oscillator is accurate and the torque motor is linear the output frequency $f$ of the voltage controlled oscillator necessarily corresponds to the mass rate of flow for a steady state balanced condition of the reaction turbine. The mathematical explanation of the result is the same as that given above in connection with the operation of the basic system shown on FIG. 1 wherein the output frequency $f$ may be substituted for the signal $S_2$.

While there have been shown and described in FIGS. 1, 8 and 9 what are considered to be preferred embodiments of the invention, it will be apparent to those skilled in the art that various changes and modifications may be made therein without departing from the spirit or scope of the invention.

What is claimed as new and desired to be secured by Letters Patent of the United States is:

1. In a mass flow meter system of the angular momentum type;
    (a) a casing for conducting fluid, the flow of which is to be measured,
    (b) swirl generating means in said casing for imparting angular velocity to said fluid in a circumferential direction,
    (c) means responsive to the angular velocity of said fluid and producing a speed signal variable in accordance with said velocity,
    (d) a rotatable reaction member disposed in said casing downstream of said swirl generating means on which a reaction torque is exerted by said fluid to cause deflection of said reaction member,
    (e) a torque motor connected to said reaction member for applying thereto a counter torque in a direction to resist said deflection,
    (f) means responsive to the deflection of said reaction member and producing a position signal variable in accordance with said deflection,
    (g) control means responsive to said speed and position signals for controlling the output torque of said torque motor in accordance with the combined effect of said speed and position signals whereby said reaction member is maintained in a balanced position in which the deflection is solely proportional to the mass flow rate and varies with the mass flow rate of said fluid, only,
    (h) an indicating means actuated in response to the deflection of said reaction member for indicating mass flow rate.

2. A mass flowmeter system as set forth in claim 1 wherein the control means comprises means for multiplying the speed and position signals.

3. A mass flowmeter system as set forth in claim 1 wherein the means responsive to the angular velocity of the fluid is a speed turbine and the means producing a speed signal is a pickoff actuated by rotation of the speed turbine.

4. A mass flowmeter system as set forth in claim 1 wherein the swirl generating means comprises a set of skewed vanes located upstream with respect to the speed turbine.

5. A mass flowmeter system as set forth in claim 1 wherein the indicating means comprises a transformer responsive to deflection of the reaction member and producing output pulses the frequency of which varies with said deflection and a counter for counting said output pulses.

6. In a mass flowmeter system,
    (a) a transmitter having a casing conducting fluid the flow of which is to be measured,
    (b) a set of skewed vanes in said casing for imparting swirl to said fluid.
    (c) a speed turbine in said casing downstream from said vanes free to rotate the swirl velocity of said fluid,
    (d) signal generating means associated with swirl speed turbine producing a speed signal varying with the speed of said speed turbine,
    (e) a reaction turbine in said casing downstream from said speed turbine arranged to deflect between zero and maximum flow positions,
    (f) signal generating means associated with said reaction turbine producing a position signal varying with the amount of deflection of said reaction turbine,
    (g) a torque motor restraining said reaction turbine having a restraining torque variable with an input current supplied thereto,
    (h) control means responsive to said speed and position signals producing a series of control pulses initiated at intervals variable in accordance with said speed signal, each pulse having a magnitude variable in accordance with said position signal,
    (i) a current generator controlled by said control means supplying current to said torque motor variable in accordance with the average value of said control pulses, and
    (j) flow indicating means responsive to said position signal.

7. A mass flowmeter system as set forth in claim 6 wherein the signal generating means associated with the reaction turbine produces output pulses having a frequency variable with the amount of deflection of the reaction turbine and the flow indicating means comprises a counted for counting the pulses produced by said signal generating means.

8. A mass flowmeter system as set forth in claim 6 wherein each control pulse produced by the control means has a constant amplitude, the control pulse width being variable in accordance with the position signal.

9. A mass flowmeter system as set forth in claim 6 wherein the signal generating means associated with the reaction turbine produces output pulses having a frequency variable with the amount of deflection of the reaction turbine and the control means comprises counting means actuated by the speed signal for counting the output pulses produced by said signal generating means during a fixed time interval and for varying the width of the control pulse produced by the control means in accordance with the number of pulses counted by the counting means during said time interval.

10. A mass flowmeter system as set forth in claim 9 wherein the indicating means comprises a counter for counting the pulses produced by the signal generating means.

11. A mass flowmeter system as set forth in claim 9 wherein the counting means comprises first and second counters arranged so that the first counter counts the output pulses from the signal generating means associated with the reaction turbine during a fixed time interval determined by the second counter, after which the second counter determines a time interval variable with the pulse count on the first counter.

12. In a mass flowmeter system having a transmitter adapted to be coupled into a fluid flow path including a set of skewed vanes for imparting swirl to the fluid, a speed turbine downstream from said vanes, a reaction turbine downstream from said speed turbine and a torque motor for restraining said reaction turbine, a control and indicating system for said transmitter comprising:
(a) means producing a speed signal variable with the speed of the speed turbine,
(b) means producing a position signal variable with the deflection of the reaction turbine,
(c) multiplying means for multiplying the speed and position signals to produce a resultant signal variable with the product of said speed and position signals,
(d) means controlling the torque of said torque motor in accordance with same resultant signal, and
(e) a mass flow indicator actuated in response to said position signal, 13. A mass flowmeter system as set forth in claim 12 wherein the signal multiplying means comprises a potentiometer having a fixed resistor energized in accordance with the speed signal and a slider positioned in accordance with the position signal.

14. A mass flowmeter system as recited in claim 12 wherein the signal multiplying means comprises means for generating a series of control pulses the frequency of which is determined by the speed signal and the magnitude of which is determined by the position signal and means for producing a resultant signal variable in accordance with the average value of said control pulses.

15. A mass flowmeter system as set forth in claim 12 including a transducer for converting the position signal into a series of pulses the frequency of which varies with the position signal and the indicator comprises a counter for counting said output pulses to indicate mass flow of the fluid.

16. A mass flow meter system as set forth in claim 1 wherein said control means for controlling the output torque of said torque motor comprises means for producing a signal proportional to the product of the speed and position signals.

References Cited

UNITED STATES PATENTS

| | | | |
|---|---|---|---|
| 720,188 | 2/1903 | Seidener | 73—194 |
| 2,582,146 | 1/1952 | Moore | 73—133 |
| 2,975,635 | 3/1961 | Kindler | 73—194 |
| 3,232,110 | 2/1966 | Li | 73—231M |
| 3,241,367 | 3/1966 | Moss | 73—231 |
| 3,306,105 | 2/1967 | Ichihara | 73—231 |

RICHARD C. QUEISER, Primary Examiner

J. WHALEN, Assistant Examiner

U.S. Cl. X.R.

73—231M